(12) United States Patent
Wippler

(10) Patent No.: US 8,489,275 B2
(45) Date of Patent: Jul. 16, 2013

(54) METHODS FOR SELECTIVE ACTIVATION OF MULTIMEDIA FUNCTIONS AND VEHICLES INCORPORATING THE SAME

(75) Inventor: Erik Anthony Wippler, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 252 days.

(21) Appl. No.: 13/150,619

(22) Filed: Jun. 1, 2011

(65) Prior Publication Data

US 2012/0310477 A1    Dec. 6, 2012

(51) Int. Cl.
*G06F 19/00* (2006.01)
*G06F 17/00* (2006.01)

(52) U.S. Cl.
USPC ............. 701/36; 701/31.6; 701/400; 345/156

(58) Field of Classification Search
USPC ................. 701/36, 31, 6, 400, 53; 345/156, 345/55
See application file for complete search history.

(56) References Cited

U.S. PATENT DOCUMENTS

| | | | |
|---|---|---|---|
| 6,029,110 A * | 2/2000 | Zuber et al. .................... | 701/400 |
| 6,181,996 B1 * | 1/2001 | Chou et al. ...................... | 701/36 |
| 6,256,558 B1 * | 7/2001 | Sugiura et al. .................... | 701/1 |
| 7,269,504 B2 | 9/2007 | Gardner et al. | |
| 7,292,152 B2 | 11/2007 | Torkkola et al. | |
| 7,428,449 B2 | 9/2008 | Fehr et al. | |
| 7,734,061 B2 | 6/2010 | Breed et al. | |
| 7,894,953 B2 | 2/2011 | Geisler et al. | |
| 2008/0129684 A1 | 6/2008 | Adams et al. | |
| 2010/0250044 A1 | 9/2010 | Alasry et al. | |
| 2011/0211710 A1 * | 9/2011 | Nagasawa et al. .............. | 381/86 |

* cited by examiner

*Primary Examiner* — Tan Q Nguyen

(74) *Attorney, Agent, or Firm* — Dinsmore & Shohl LLP

(57) ABSTRACT

In one embodiment, a method for selective activation of vehicle multimedia functions may include receiving a passenger occupancy signal indicative of an occupancy of a passenger seat from a passenger detection sensor. A gear signal indicative of a gear ratio of a transmission may be received from a vehicle gear sensor. Access to a medium interaction level function of a vehicle multimedia system may be prevented, when the passenger occupancy signal indicates that the passenger seat is unoccupied and the gear signal indicates that the gear ratio of the transmission corresponds to a motive gear. Access to the medium interaction level function of the vehicle multimedia system may be allowed, when the passenger occupancy signal indicates that the passenger seat is occupied with a passenger and the gear signal indicates that the gear ratio of the transmission corresponds to the motive gear.

20 Claims, 2 Drawing Sheets

METHODS FOR SELECTIVE ACTIVATION OF MULTIMEDIA FUNCTIONS AND VEHICLES INCORPORATING THE SAME

TECHNICAL FIELD

The present specification generally relates to vehicle multimedia systems and, more specifically, to methods for selective activation of vehicle multimedia functions.

BACKGROUND

Vehicle manufacturers may offer vehicle multimedia systems as original factory equipment that may be installed and/or integrated with a vehicle. Such multimedia systems may include a navigation system (e.g., GPS) that acquires the location of the vehicle. The navigation system may compare the acquired location to a database to provide information about the current location (e.g., points of interest or waypoints) and/or road map information. Furthermore, the vehicle navigation system may provide directions to a destination by receiving destination data indicative of a user's desired destination.

Some manufacturers allow full functionality ("no-lockout system") of the vehicle multimedia system regardless of the state of the vehicle. Other manufacturers lock all functionality ("full-lockout system") when the vehicle is in motion. For example, a user may not be able to provide any input to a navigation system of the vehicle multimedia system when the vehicle is moving. Thus, a vehicle driver and/or passenger may not be able to obtain directions from the navigation system without stopping the motion of the vehicle. Some vehicle multimedia systems utilize voice recognition for the entry of destination information while the vehicle is in motion. However, destination information entered via voice recognition may generate incorrect address information and/or misrecognition errors.

Accordingly, a need exists for alternative methods for selective activation of vehicle multimedia functions.

SUMMARY

In one embodiment, a method for selective activation of vehicle multimedia functions may include, receiving a passenger occupancy signal indicative of an occupancy of a passenger seat from a passenger detection sensor. A gear signal indicative of a gear ratio of a transmission may be received from a vehicle gear sensor. Access to a medium interaction level function of a vehicle multimedia system may be prevented, automatically with a multimedia electronic control unit, when the passenger occupancy signal indicates that the passenger seat is unoccupied and the gear signal indicates that the gear ratio of the transmission corresponds to a motive gear. Access to the medium interaction level function of the vehicle multimedia system may be allowed, automatically with the multimedia electronic control unit, when the passenger occupancy signal indicates that the passenger seat is occupied with a passenger and the gear signal indicates that the gear ratio of the transmission corresponds to the motive gear.

In another embodiment, a method for selective activation of vehicle multimedia functions may include receiving a passenger occupancy signal indicative of an occupancy of a passenger seat from a passenger detection sensor. A gear signal indicative of a gear ratio of a transmission may be received from a vehicle gear sensor. Access to a medium interaction level function of a vehicle multimedia system may be prevented, automatically with a multimedia electronic control unit, when the gear signal indicates that the gear ratio of the transmission corresponds to a motive gear. Access to the medium interaction level function of the vehicle multimedia system may be allowed, automatically with the multimedia electronic control unit, when: the gear signal indicates that the gear ratio of the transmission corresponds to a non-motive gear; or the passenger occupancy signal indicates that the passenger seat is occupied with a passenger and the gear signal indicates that the gear ratio of the transmission corresponds to the motive gear.

In yet another embodiment, a vehicle may include a communication path, a passenger detection sensor, a vehicle gear sensor, and a vehicle multimedia system. The passenger detection sensor may be communicatively coupled to the communication path and may be operatively coupled to a passenger seat disposed within a passenger compartment of the vehicle. The vehicle gear sensor may be communicatively coupled to the communication path and may be operatively coupled to a transmission. The vehicle multimedia system may be communicatively coupled to the communication path. The vehicle multimedia system may include a multimedia electronic control unit. In response to a passenger occupancy signal transmitted by the passenger detection sensor via the communication path and a gear signal transmitted by the vehicle gear sensor via the communication path, the multimedia electronic control unit executes machine readable instructions. The vehicle multimedia system may prevent access to a medium interaction level function of the vehicle multimedia system, when the passenger occupancy signal indicates that the passenger seat is unoccupied and the gear signal indicates that a gear ratio of the transmission corresponds to a motive gear. The vehicle multimedia system may allow access to the medium interaction level function of the vehicle multimedia system, when the passenger occupancy signal indicates that the passenger seat is occupied with a passenger and the gear signal indicates that the gear ratio of the transmission corresponds to the motive gear.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
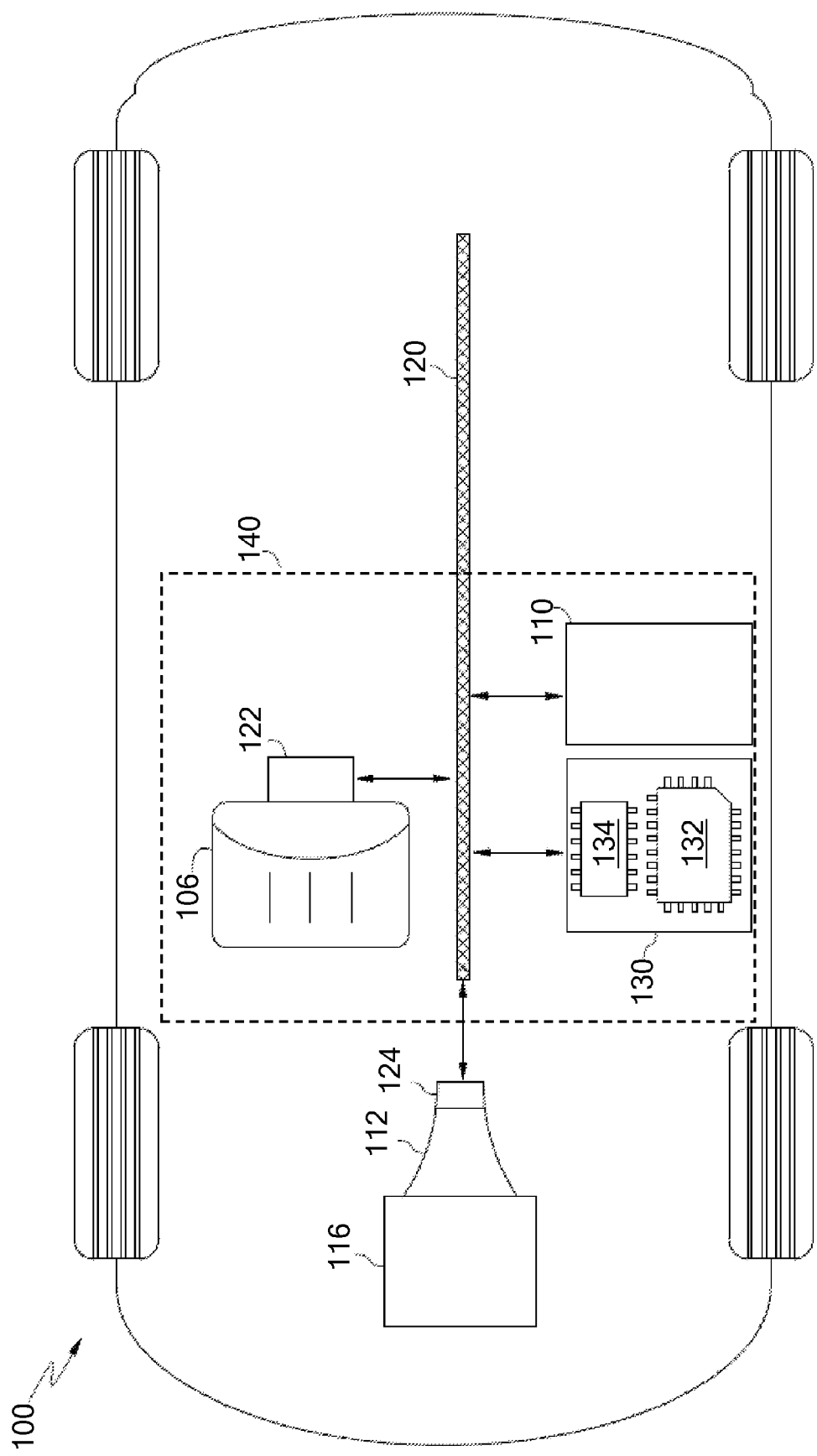
FIG. 1 schematically depicts a vehicle having a vehicle multimedia system according to one or more embodiments shown and described herein.

FIG. 1 depicts one embodiment of a vehicle multimedia system. The vehicle multimedia system may be operatively coupled to a communication path, a passenger detection sensor and a vehicle gear sensor. The vehicle multimedia system performs functions, which may be selectively activated or deactivated based at least in part upon output of the passenger detection sensor and/or the vehicle gear sensor. Various embodiments of a method for the selective activation of functions of a vehicle multimedia system, as well as vehicles incorporating the same, will be described in detail herein.

Referring now to FIG. 1, an embodiment of a vehicle 100 with a vehicle multimedia system 130 configured for selective activation of vehicle multimedia functions is schematically depicted. The vehicle 100 generally comprises a communication path 120, a passenger detection sensor 122, a vehicle gear sensor 124, and a vehicle multimedia system 130. The communication path 120 is a data exchange medium that provides data interconnectivity between various vehicle modules. The communication path 120 may comprise a conductive material that permits the transmission of electrical data signals to processors, sensors, and actuators throughout the vehicle 100. Each of the modules may be operatively coupled to one another, i.e., the modules can operate as nodes that may send and/or receive messages to perform actions synchronously and/or cooperatively.

In one embodiment, the communication path 120 can be a communication bus that provides a network for linking multiple modules and allowing each module to communicate with any other module such as, for example, a LIN bus, a CAN bus, a VAN bus, and the like. Accordingly, each module can be a node on the communication bus that coordinates functions and communicates with the other modules using communication protocols over the communication bus. In another embodiment, the communication path 120 may comprise one or more individual wires that interconnect various modules. In further embodiments, the communication path 120 may be a transmissive media such as air for transmitting data wirelessly or, alternatively, an optical waveguide.

The vehicle 100 further comprises a passenger detection sensor 122 for determining if an occupant is positioned in a passenger seat 106 of the vehicle 100. For example, in one embodiment, the passenger detection sensor 122 may be connected to the passenger seat 106 such that a passenger occupancy signal indicative of the occupancy of the passenger seat 106 is provided by the passenger detection sensor 122. The passenger occupancy signal may be indicative of pressure, force, mass, or temperature that can be correlated to the occupancy of the passenger seat 106. Specifically, the passenger occupancy signal may indicate that the passenger seat is unoccupied and the passenger occupancy signal may indicate that the passenger seat is occupied, such that the unoccupied signal is distinguishable from the occupied signal. In further embodiments, the passenger detection sensor 122 may be an optical system, such as a camera, or may be sensed by sensing the input and/or output of any module communicatively coupled to the communication path 120 such as an engine control unit, an airbag controller, audio system controller, and the like.

It is noted that the term "sensor," as used herein, means a device that measures a physical quantity and converts it into a signal, which is correlated to the measured value of the physical quantity. Furthermore, the term "signal" means a waveform (e.g., electrical, optical, magnetic, or electromagnetic), such as DC, AC, sinusoidal-wave, triangular-wave, square-wave, and the like, capable of traveling through a medium.

Referring still to FIG. 1, the vehicle 100 further comprises a vehicle gear sensor 124 for providing a gear signal indicative of a gear ratio of a transmission 112 that changes gear ratios to convert energy supplied by a motor 116 of the vehicle 100 to a suitable speed and/or torque for delivery to a propulsion mechanism (e.g., via a driveshaft and differentials that turn at least one wheel). The vehicle gear sensor 124 may be coupled to the transmission 112. The gear signal may indicate that the gear ratio of the transmission 112 corresponds to a motive gear (e.g., reverse, drive, first gear, second gear, and the like) and the gear signal may indicate that the gear ratio of the transmission 112 corresponds to a non-motive gear (e.g., park), such that the motive signal is distinguishable from the non-motive signal.

Figure 2:
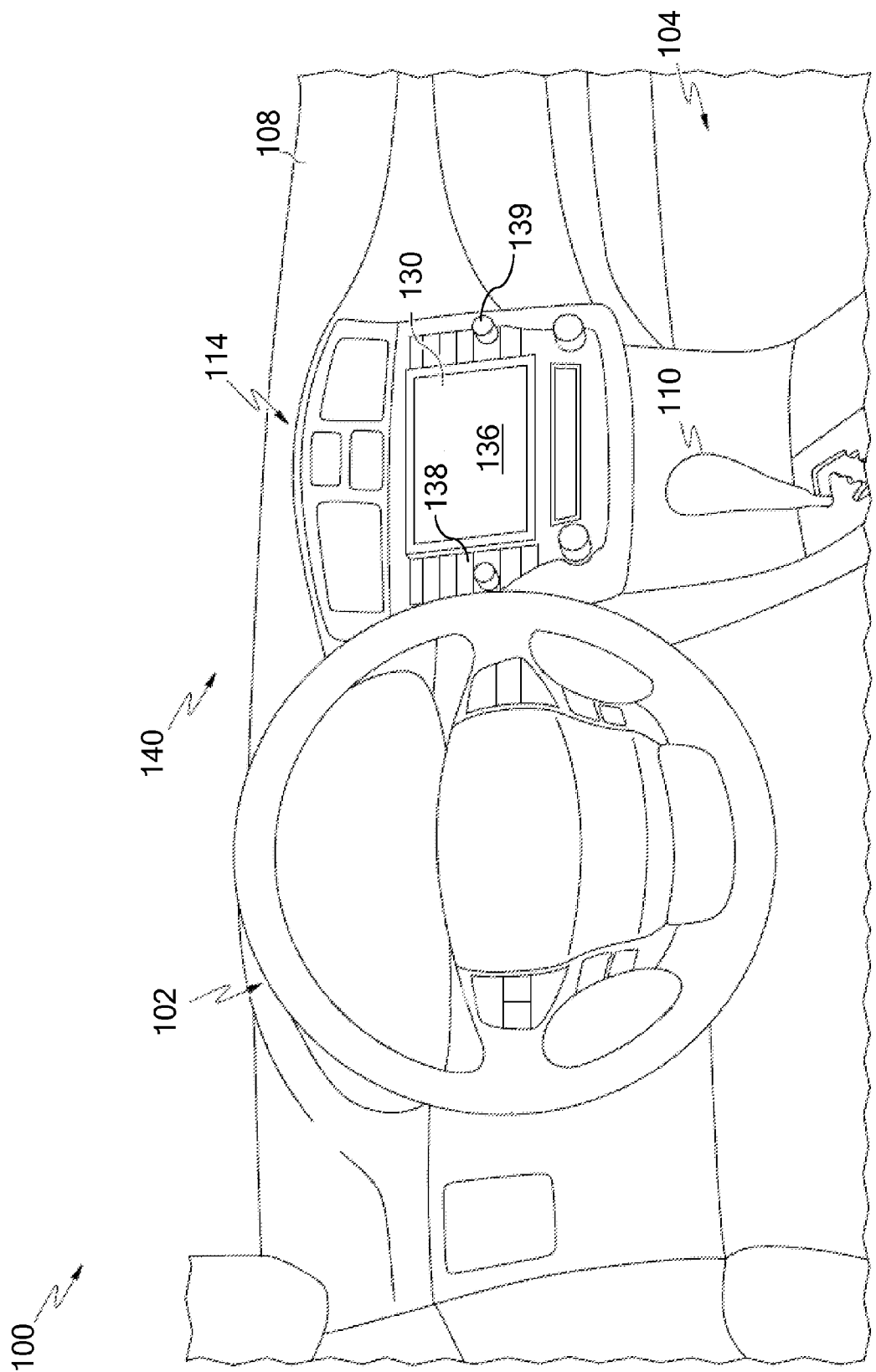
FIG. 2 schematically depicts a vehicle having a vehicle multimedia system according to one or more embodiments shown and described herein.

Referring collectively to FIGS. 1 and 2, the vehicle gear sensor 124 may be coupled to a gear indicator of the transmission 112. The gear indicator may be disposed in the instrument panel 108 of the passenger compartment 140. In one embodiment, the vehicle gear sensor may be coupled to the gear changer 110 such that the position of the gear changer is detected and correlated to a motive and/or non-motive gear. The transmission 112 may be an automatic transmission, a continuously variable transmission, or any other current or future transmission design comprising a park gear and at least one drive gear. In alternative embodiments, the vehicle gear sensor 124 may be coupled to any input or output of any electrical component in the vehicle to detect a motive and/or non-motive gear. Furthermore, it is noted that the term "gear" is used in a colloquial sense and is not intended to limit this disclosure to systems comprising mechanical gears.

Referring again to FIG. 1, the vehicle 100 comprises a vehicle multimedia system 130 for providing multimedia functions such as navigation and/or entertainment. The vehicle multimedia system 130 may comprise a multimedia electronic control unit 132 for executing machine readable instructions and a multimedia memory 134 for storing machine readable instructions. The multimedia electronic control unit 132 and the multimedia memory 134 are communicatively coupled to the multimedia memory 134. The multimedia electronic control unit 132 may be a processor, an integrated circuit, a microchip, a computer, or any other computing device capable of executing machine readable instructions. The multimedia memory 134 may be RAM, ROM, a flash memory, a hard drive, or any device capable of storing machine readable instructions.

In the embodiments described herein, the multimedia electronic control unit 132 and the multimedia memory 134 may be integral with the vehicle multimedia system 130. However, it is noted that the multimedia electronic control unit 132, the multimedia memory 134, and the vehicle multimedia system 130 may be discrete components communicatively coupled with one another without departing from the scope of the present disclosure. As used herein, the phrase "communicatively coupled" means that components are capable of exchanging data signals with one another such as, for example, electrical signals via conductive medium, electromagnetic signals via air, optical signals via optical waveguides, and the like.

The machine readable instructions may comprise logic or an algorithm written in any programming language of any generation (e.g., 1GL, 2GL, 3GL, 4GL, or 5GL) such as, for example, machine language that may be directly executed by the multimedia electronic control unit 132, or assembly language, object-oriented programming (OOP), scripting languages, microcode, etc., that may be compiled or assembled into machine readable instructions and stored on a machine readable medium. Alternatively or additionally, the multimedia electronic control unit 132 may comprise hardware encoded with the machine readable instructions, i.e., the logic or algorithm may be written in a hardware description language (HDL), such as implemented via either a field-programmable gate array (FPGA) configuration or an application-specific integrated circuit (ASIC), and their equivalents.

The vehicle multimedia system 130 performs functions. Specifically, the multimedia electronic control unit 132 can execute machine readable instructions stored on the multimedia memory 134 to provide functions according to user input. The functions include multimedia functions such as, for example, providing location information, providing directions to a destination, providing waypoint information, providing point of interest information, providing audio entertainment, providing video entertainment, establishing a personal area network between a portable electronic device (e.g., mobile phones and/or music players) and the vehicle multimedia system 130, providing time information, providing weather information, providing climate controls, transmitting data via a previously establish personal area network, downloading content from web server, advanced vehicle setup menus, web-based applications (e.g., twitter or facebook), and the like. In some embodiments, the vehicle multimedia system 130 may include a vehicle navigation system (e.g., GPS) that can acquire information regarding the current location of the vehicle 100 and direct the vehicle 100 to a desired destination based at least in part upon the current location and/or a database having map information.

Referring collectively to FIGS. 1 and 2, the vehicle multimedia system 130 includes one or more human-machine-interface controls positioned within the passenger compartment 140 that allow a user to provide input into the vehicle multimedia system 130. Specifically, the human-machine-interface controls may include a touch screen 136, a button 138, a knob 139, or a combination thereof. For example, a user may physically manipulate a touch screen 136 (e.g., tapping or hovering). The physical motion may then be digitized and transmitted to the multimedia electronic control unit 132. The multimedia electronic control unit 132 may execute a multimedia function according to the digitized information and the machine readable instructions stored in the multimedia memory 134. Accordingly, an input is a single physical manipulation of a human-machine-interface control such as, for example, a touch of a screen, a push of a button, or a twist of a knob. In further embodiments, the human-machine-interface control may be any type of control positioned within the passenger compartment 140, such as, for example, voice recognition systems, image recognition systems, controls located on a console and any other control module communicatively coupled to the communication path 120.

Moreover, the multimedia functions may be classified according to the level of user input required to perform the function, i.e., the multimedia functions may be classified according to the length of time and the number of operations a user needs to perform to provide input. Specifically, the multimedia functions may be classified as low interaction level functions, medium interaction level functions and high interaction level functions. The low interaction level functions include multimedia functions requiring no user input (e.g., providing location information, providing time information, providing weather information, transmitting data via a previously establish personal area network and the like) or user inputs that can be performed under a low time threshold and/or under a low input threshold. For example, when the low time threshold is about 1 sec. and the low input threshold is about 2 inputs, the low input group may include multimedia functions such as providing audio entertainment (e.g., changing the radio station, changing the song, etc.) or providing climate controls (e.g., adjusting the air conditioner, heat and/or fan speed). The low time threshold may be any time from about 0 sec. to about 30 sec. such as, for example, about 2 sec., about 3 sec., about 4 sec., or about 10 sec. The low input threshold may be any number of inputs from about 0 inputs to about 30 inputs such as, for example, about 1 input, or about 2 inputs, or about 4 inputs, about 10 inputs or about 20 inputs.

The medium interaction level functions include multimedia functions requiring a medium level of user input (e.g., entering destination information, entering favorite location information, and the like). Specifically, the medium interaction level functions include user inputs that can be performed under a high time threshold and/or under a high input threshold and over the low time threshold and/or over the low input threshold. For example, the low time threshold may be about 1 sec. and the low input threshold is about 2 inputs and the high time threshold may be about 15 sec. and the high input threshold may be about 30 inputs. The high time threshold may be any time from about 5 sec. to about 90 sec. such as, for example, about 10 sec., about 15 sec., about 20 sec., or about 30 sec. The high input threshold may be any number of inputs from about 5 inputs to about 150 inputs such as, for example, about 5 inputs, or about 10 inputs, or about 20 inputs, about 30 inputs or about 50 inputs.

The high interaction level functions include multimedia functions requiring an even higher level of user input relative to the medium interaction level functions. The high input group may include user inputs that can be performed over a high time threshold and/or over a high input threshold. For example, a large amount of user input and responses may be necessary to establish a personal area network (e.g., bluetooth) between a portable electronic device and the vehicle multimedia system 130, i.e., pairing the portable electronic device with the vehicle multimedia system 130 such that future connections may be made without user intervention.

According to the embodiments described herein, the vehicle multimedia system 130 is operatively coupled to the vehicle 100 to provide multimedia functions, i.e., the vehicle multimedia system 130 may be powered by the electrical system of the vehicle 100 (e.g., via a battery and/or alternator). The vehicle multimedia system 130 may be located in a passenger compartment 140 of a vehicle 100. The passenger compartment 140 includes an instrument panel 108 having a central portion 114. The instrument panel 108 spans across the passenger compartment 140 from the driver side 102 to the passenger side 104, such that the central portion 114 is positioned in the center region of the instrument panel 108. Accordingly, when the vehicle multimedia system 130 is located in the central portion 114 of the instrument panel 108, the vehicle multimedia system 130 may be accessed from the driver side 102 of the passenger compartment 140 and the passenger side 104 of the passenger compartment 140. In some embodiments, the vehicle multimedia system 130 may be integrated into the instrument panel 108.

Referring again to FIG. 1, the communication path 120 is communicatively coupled to the passenger detection sensor 122, the vehicle gear sensor 124 and the vehicle multimedia system 130. The passenger detection sensor 122 is operatively coupled to a passenger seat 106. Specifically, passenger detection sensor 122 may be a pressure sensor that detects the occupancy of the passenger seat 106 such as, for example, an air bag sensor that detects the presence of a passenger to activate an air bag or a seat belt sensor that detects the presence of a passenger to activate an indicator that informs the passenger to wear a seat belt. The passenger detection sensor 122 transmits a passenger occupancy signal (e.g., synchronously or asynchronously) through the communication path 120. Accordingly, the passenger occupancy signal can be indicative of the sensed occupancy of the passenger seat 106.

The vehicle gear sensor 124 is operatively coupled to the transmission 112 to detect the gear ratio of the transmission 112. The vehicle gear sensor 124 transmits a gear signal (e.g., synchronously or asynchronously) that is indicative of the gear ratio of the transmission 112 through the communication path 120. Accordingly, the vehicle multimedia system 130 receives the passenger occupancy signal and/or the gear signal through the communication path 120. In some embodiments, the communication path 120 may be a communication bus. In further embodiments, the vehicle multimedia system 130 may be directly wired to the passenger detection sensor 122 and/or the vehicle gear sensor 124. Furthermore, it is noted that, while the gear changer 110 and the vehicle gear sensor 124 are depicted in FIG. 1 as being communicatively coupled via the communication path 120, the vehicle gear sensor 124 may be operatively coupled to the gear changer 110 to transform the position of the gear changer 110 into the gear signal.

The vehicle multimedia system 130 selectively activates vehicle multimedia functions according to the passenger occupancy signal and/or the gear signal. Specifically, the vehicle multimedia system 130 may prevent access to certain multimedia functions (i.e., alter the human-machine-interface controls such that a user cannot input information into the vehicle multimedia system 130 depending upon sensed vehicle conditions). In one embodiment, medium interaction level functions (e.g., entry of destination information) may alternate between an active and inactive state in response to the passenger occupancy signal and/or the gear signal. For example, access to medium interaction level functions of the vehicle multimedia system 130 may be prevented when the passenger occupancy signal indicates that the passenger seat 106 is unoccupied and the gear signal indicates that a gear ratio of the transmission 112 corresponds to a motive gear. Access to the medium interaction level function of the vehicle multimedia system 130 may be allowed when the passenger occupancy signal indicates that the passenger seat 106 is occupied with a passenger and the gear signal indicates that the gear ratio of the transmission 112 corresponds to a motive gear. Thus, for example, a passenger may be capable of providing input for the medium interaction level function, while a driver without a passenger in the vehicle may be prevented from providing input to at least the medium interaction level function of the vehicle multimedia system 130.

In another embodiment, access to at least the medium interaction level functions of the vehicle multimedia system 130 may be prevented when the gear signal indicates that a gear ratio of the transmission 112 corresponds to a motive gear. Access to at least the medium interaction level functions of the vehicle multimedia system 130 may be allowed when the gear signal indicates that the gear ratio of the transmission 112 corresponds to a non-motive gear. Access to the medium interaction level function of the vehicle multimedia system 130 may also be allowed when the passenger occupancy signal indicates that the passenger seat 106 is occupied with a passenger and the gear signal indicates that the gear ratio of the transmission 112 corresponds to the motive gear.

In one embodiment, access to high interaction level functions of the vehicle multimedia system 130 may be controlled based upon the gear signal and not the passenger occupancy signal, i.e., access to high interaction level functions may be independent of the passenger occupancy signal. In one embodiment, access to a high interaction level function of the vehicle multimedia system 130 may be prevented when the gear signal indicates that a gear ratio of the transmission 112 corresponds to a motive gear. While, access to the high interaction level function of the vehicle multimedia system 130 may be allowed when the gear signal indicates that the gear ratio of the transmission 112 corresponds to a non-motive gear. Thus, according to the embodiments described herein, high interaction level functions may always be off when the gear signal indicates that a gear ratio of the transmission 112 corresponds to a motive gear regardless of the occupancy of the passenger seat 106.

In further embodiments, access to low interaction level functions of the vehicle multimedia system 130 may be provided persistently while the vehicle multimedia system 130 is activated, i.e., access to low interaction level functions may be independent of the passenger occupancy signal and/or the gear signal. In one embodiment, access to a low interaction level function of the vehicle multimedia system 130 may be allowed regardless of whether the passenger occupancy signal indicates that the passenger seat 106 is unoccupied or occupied and the gear signal indicates that a gear ratio of the transmission 112 corresponds to a motive gear or a non-motive gear. Accordingly, access to low interaction level functions may be provided even when access to medium interaction level functions and/or high interaction level functions is prevented.

In one embodiment, as depicted in FIGS. 1 and 2, access to low interaction level functions are provided persistently, medium interaction level functions are prevented when the passenger occupancy signal indicates that the passenger seat 106 is unoccupied and the gear signal indicates that the gear ratio of the transmission 112 corresponds to a motive gear, and high interaction level functions are prevented when the gear signal indicates that the gear ratio of the transmission 112 corresponds to a motive gear. Accordingly, functions of the vehicle multimedia system 130 are selectively activated depending upon certain sensed conditions. For example, a driver may provide power to the vehicle multimedia system 130 from an electrical system by actuating an ignition of the vehicle 100. Upon being powered, the vehicle multimedia system 130 can be activated. While the vehicle 100 is in a non-motive gear, the driver can provide input to low interaction level functions, medium interaction level functions, and high interaction level functions. Thus, for example, the driver can change the radio station, enter destination information into the vehicle multimedia system 130, and pair a personal electronic device to the vehicle multimedia system 130. After the vehicle 100 is placed in a motive gear, the driver, without a passenger in the passenger seat 106, can provide input to low interaction level functions, but cannot provide input to medium interaction level functions, and high interaction level functions. Thus, for example, the driver can change the radio station, but the vehicle multimedia system 130 will not allow entry of destination information or pairing of personal electronic devices (e.g., an indication that the function is not available may be provided and/or the functions may be removed or obscured from a displayed menu). If a passenger is seated in the passenger seat 106 while the vehicle 100 is in a motive gear, the passenger may provide input to low interaction level functions and medium interaction level functions, but cannot provide high interaction level functions. Thus, for example, the passenger can change the radio station and enter destination information, but the vehicle multimedia system 130 will not allow the passenger to pair a personal electronic device to the vehicle multimedia system 130.

It should now be understood that the embodiments described herein relate to selective activation of vehicle multimedia functions. The methods and systems detect if a vehicle is in a motive gear and may prevent access to certain multimedia functions, while the vehicle is in the motive gear. For example, a driver may be prevented from entering destination information into a vehicle multimedia system (e.g., a GPS) while the vehicle is in a motive gear. However, it may be desirable to allow a passenger to enter destination information into the vehicle multimedia system. Thus, the methods and systems described herein may detect the presence of a passenger in the passenger seat and allow access to certain functions to enable a passenger to input the information.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for selective activation of vehicle multimedia functions, the method comprising:
   receiving a passenger occupancy signal indicative of an occupancy of a passenger seat from a passenger detection sensor;
   receiving a gear signal indicative of a gear ratio of a transmission from a vehicle gear sensor;
   preventing access to at least a medium interaction level function of a vehicle multimedia system, automatically with a multimedia electronic control unit, when the passenger occupancy signal indicates that the passenger seat is unoccupied and the gear signal indicates that the gear ratio of the transmission corresponds to a motive gear; and
   allowing access to at least the medium interaction level function of the vehicle multimedia system, automatically with the multimedia electronic control unit, when the passenger occupancy signal indicates that the passenger seat is occupied with a passenger and the gear signal indicates that the gear ratio of the transmission corresponds to the motive gear.

2. The method of claim 1, further comprising allowing access to at least the medium interaction level function of the vehicle multimedia system when the gear signal indicates that the gear ratio of the transmission corresponds to a non-motive gear.

3. The method of claim 2, wherein the non-motive gear is park.

4. The method of claim 1, further comprising allowing access to a low interaction level function of the vehicle multimedia system persistently while the vehicle multimedia system is activated.

5. The method of claim 4, further comprising preventing access to at least a high interaction level function of the vehicle multimedia system when the gear signal indicates that the gear ratio of the transmission corresponds to the motive gear.

6. The method of claim 5, wherein the high interaction level function of the vehicle multimedia system establishes a personal area network between the vehicle multimedia system and a personal electronic device.

7. The method of claim 1, wherein the vehicle multimedia system is wired directly to the passenger detection sensor, the vehicle gear sensor, or both.

8. The method of claim 1, wherein the vehicle multimedia system is communicatively coupled to the passenger detection sensor, the vehicle gear sensor, or both through a communication bus.

9. The method of claim 1, wherein the vehicle multimedia system comprises a navigation system and the medium interaction level function of the vehicle multimedia system comprises entering destination information into the navigation system.

10. The method of claim 1, wherein the passenger occupancy signal is indicative of pressure, force, mass or temperature applied to the passenger seat.

11. A method for selective activation of vehicle multimedia functions, the method comprising:
    receiving a passenger occupancy signal indicative of an occupancy of a passenger seat from a passenger detection sensor;
    receiving a gear signal indicative of a gear ratio of a transmission from a vehicle gear sensor;
    preventing access to at least a medium interaction level function of a vehicle multimedia system, automatically with a multimedia electronic control unit, when the gear signal indicates that the gear ratio of the transmission corresponds to a motive gear; and
    allowing access to at least the medium interaction level function of the vehicle multimedia system, automatically with the multimedia electronic control unit, when:
        the gear signal indicates that the gear ratio of the transmission corresponds to a non-motive gear; or
        the passenger occupancy signal indicates that the passenger seat is occupied with a passenger and the gear signal indicates that the gear ratio of the transmission corresponds to the motive gear.

12. The method of claim 11, further comprising preventing access to at least a high interaction level function of the vehicle multimedia system, when the gear signal indicates that the gear ratio of the transmission corresponds to the motive gear.

13. The method of claim 12, further comprising allowing access to a low interaction level function of the vehicle multimedia system persistently while the vehicle multimedia system is activated.

14. The method of claim 13, wherein the high interaction level function of the vehicle multimedia system comprises establishing a personal area network between the vehicle multimedia system and a personal electronic device.

15. The method of claim 13, wherein the vehicle multimedia system comprises a navigation system and the medium interaction level function of the vehicle multimedia system comprises entering destination information into the navigation system.

16. A vehicle comprising:
    a communication path;
    a passenger detection sensor communicatively coupled to the communication path and operatively coupled to a passenger seat disposed within a passenger compartment of the vehicle;
    a vehicle gear sensor communicatively coupled to the communication path and operatively coupled to a transmission; and
    a vehicle multimedia system communicatively coupled to the communication path, the vehicle multimedia system comprising a multimedia electronic control unit, wherein, in response to a passenger occupancy signal transmitted by the passenger detection sensor via the communication path and a gear signal transmitted by the vehicle gear sensor via the communication path, the multimedia electronic control unit executes machine readable instructions to:
  prevent access to at least a medium interaction level function of the vehicle multimedia system when the passenger occupancy signal indicates that the passenger seat is unoccupied and the gear signal indicates that a gear ratio of the transmission corresponds to a motive gear; and
  allow access to at least the medium interaction level function of the vehicle multimedia system when the passenger occupancy signal indicates that the passenger seat is occupied with a passenger and the gear signal indicates that the gear ratio of the transmission corresponds to the motive gear.

17. The method of claim 16, wherein the multimedia electronic control unit executes the machine readable instructions to allow access to at least the medium interaction level function of the vehicle multimedia system when the gear signal indicates that the gear ratio of the transmission corresponds to a non-motive gear.

18. The method of claim 16, wherein the multimedia electronic control unit executes the machine readable instructions to prevent access to at least a high interaction level function of the vehicle multimedia system when the gear signal indicates that the gear ratio of the transmission corresponds to the motive gear.

19. The method of claim 16, wherein the passenger detection sensor is an air bag sensor or a seat belt sensor.

20. The method of claim 16, wherein the communication path is a communication bus.

* * * * *